Nov. 26, 1968   D. S. ROSS   3,412,733
ACETABULUM REAMER
Filed July 1, 1966

United States Patent Office 3,412,733
Patented Nov. 26, 1968

3,412,733
ACETABULUM REAMER
Donald S. Ross, Glasgow, Scotland, assignor of one-half to Zimmer Orthopaedic Limited, Bridgend, Glamorgan, Wales, a British company
Filed July 1, 1966, Ser. No. 562,232
Claims priority, application Great Britain, July 8, 1965, 28,918/65
2 Claims. (Cl. 128—305)

This invention is concerned with improvements relating to acetabulum reamers which are used when osteo-arthritis of the hip joint of a person is being treated by cup-arthroplasty. In this method of treatment the cartilage associated with the diseased hip joint is removed and an osteotome and then an acetabulum reamer are used on the acetabulum until "bleeding" bone is exposed. A metallic cup is then located within the treated acetabulum and the head of the femur is mounted within the cup after having been formed to a profile which is substantially the inverse of the profile to which the acetabulum has been formed.

Acetabulum reamers of hitherto known constructions having a solid head portion of arcuate form in profile and provided with a cutting surface have the disadvantage that the depth of the teeth forming the cutting surface is not very great with the result that after a short period of use the cutting surface becomes clogged and requires cleaning before continued use can be made of the reamer and cleaning of such surface is difficult. The teeth on the cutting surface of known acetabulum reamers with solid head portions are so formed that it is difficult to obtain an acute rake angle on the teeth.

An acetabulum reamer according to the present invention includes a head portion removably secured to one end of a drive member, the head portion comprising a plurality of concentrically disposed discs each of different diameter and each formed circumferentially with a plurality of cutting teeth, and means for clamping the discs in a stack in face to face relation to form a head portion substantially of arcuate form in profile.

An acetabulum reamer according to the invention overcomes the disadvantages of reamers of known construction in that the cutting teeth are formed on the periphery of a disc and may be formed with a greater rake angle than when formed on a solid arcuate head portion. The head portion can be readily dismantled for cleaning purposes and the teeth can be formed of greater depth to provide a better cutting surface. The head can be formed from a selection of discs of varying diameters and in this manner a range of head portions, all of substantially arcuate form in profile, but of different radii may be obtained.

A preferred embodiment of the invention is illustrated in the accompanying drawings in which.

Figure 1:
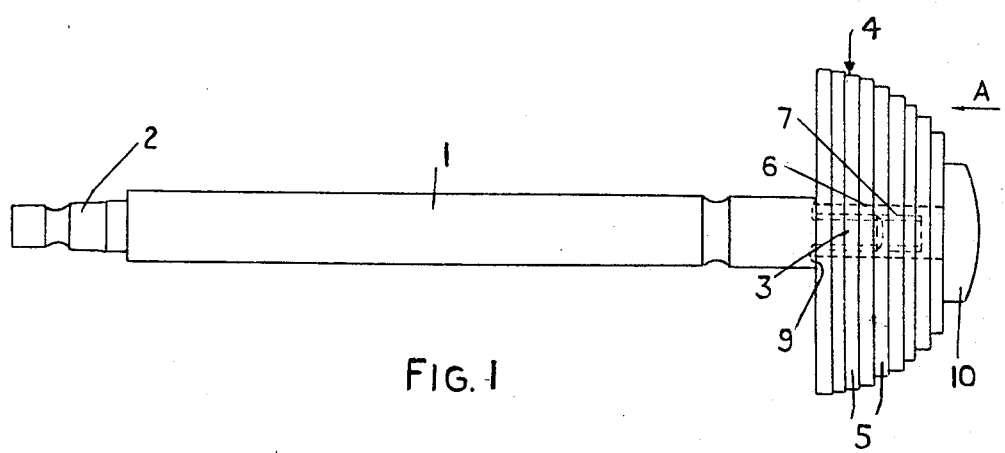
FIG. 1 is a side view of an acetabulum reamer according to the invention.
Figure 2:
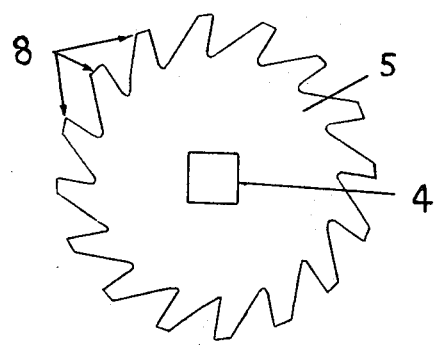
FIG. 2 is a view in the direction of the arrow A of FIG. 1 of one of the discs constituting the head portion of the reamer.

Referring to the drawings 1 denotes a drive member at one end of which is provided a stud 2 to facilitate attachment thereto of means (not shown) such as a brace, by which the drive member may be rotated about its longitudinal axis. The other end of the drive member is provided with an externally screw-threaded stud 3. A head portion denoted generally at 4 comprises a plurality of discs 5, one of which is illustrated in FIG. 2. Each disc is formed with a centrally disposed hole 4, the form and dimensions of the hole being the same in each disc. The hole 4 is shown in the drawing as being square but may be of any form which prevents rotation of the disc when mounted on a shank. The discs are stacked on a shank 6 which passes through the holes 4, the shank in cross-section being of the same form and of such dimensions as to ensure a snug fit in the holes 4. The end portion of the shank 6 adjacent to the drive member is formed with an internally screw-threaded bore 7 with which the stud 3 projecting from the drive member is in threaded engagement. The discs 5 are each formed circumferentially with a plurality of cutting teeth 8. A plurality of discs 5 of progressively varying diameters are stacked on the shank 6 in face to face relation to form the head portion 1 substantially of arcuate form in profile. The disc 5 of largest diameter abuts an annular shoulder 9 presented by the end face of the drive member adjacent the screw threaded stud and the discs are clamped together between the annular shoulder 9 and a nose portion 10, forming an abutment on the end of the shank 6 remote from the drive member. The nose portion 10 is formed with cutting teeth and is in profile of arcuate form.

The reamer is preferably formed of stainless steel.

In alternative embodiments of the invention the clamping of the discs is between the annular shoulder presented by the end face of the drive member adjacent to the screw-threaded stud and a plurality of equiangularly spaced clamping screws projecting through the discs from the face abutting the annular shoulder towards the nose and in engagement with internally screw threaded bores in the nose portion. Any known means may be provided to clamp the discs non-rotatably on the shank between the nose portion and the annular shoulder.

If a range of discs of progressively varying diameters is provided e.g. 24 discs, the head portion of the reamer may be assembled from a selection of the discs in the range to provide a range of head portions, all of substantially arcuate form in profile, but of different radii. The head portion of the reamer is assembled so that the radius thereof is appropriate for the dimensions of the acetabulum to be treated.

The depth of the cutting teeth and the rake angle of each tooth in the discs of an acetabulum reamer according to the invention is readily arranged to be greater than has been generally possible with acetabulum reamers of hitherto known constructions, the result being that reamers according to the invention are more efficient when in use and in certain circumstances the use of osteotome may be unnecessary.

What is claimed is:

1. An acetabulum reamer comprising a head portion and a drive member, said head portion removably secured to one end face of said drive member, said head portion comprising a plurality of concentrically disposed discs each of different diameter, each of said discs formed circumferentially with a plurality of cutting teeth, said discs stacked in face to face relation to form a head portion substantially of arcuate form in profile and means for clamping said stack of discs on said end face of said drive member.

2. An acetabulum reamer as claimed in claim 1 in which said clamping means comprises a shank member having a nose portion at one end and an internally screw-threaded bore at the other end in screw-threaded engagement with an externally screw-threaded stud projecting from said end face of said drive member, said end face presenting an annular shoulder, said discs each formed with a non-circular centrally disposed aperture, said shank member accommodated in said aligned apertures, said shank member being of the same form in cross-section as said apertures and of such dimensions as to ensure a snug fit in said aligned apertures, and said stack of discs clamped between said nose portion and said annular shoulder.

References Cited

UNITED STATES PATENTS 550,190  11/1895  Myers _____ 145—114

FOREIGN PATENTS 584,988  12/1924  France.

OTHER REFERENCES

Fracture Equipment by Zimmer, 1950, p. 154.

L. W. TRAPP, *Primary Examiner.*